(12) United States Patent
Oeser et al.

(10) Patent No.: US 9,834,429 B2
(45) Date of Patent: Dec. 5, 2017

(54) DEVICE FOR THE CONTAMINATION-FREE FILLING OF A TANK FROM A CANISTER

(71) Applicant: BAYER CROPSCIENCE AG, Monheim (DE)

(72) Inventors: Joerg Oeser, Muelheim an der Ruhr (DE); Reinhard Friessleben, Leverkusen (DE); Steffen Graef, Obertraubling (DE); Franz Renner, Obertraubling (DE); Markus Felixberger, Neutraubling (DE); Stefan Nissl, Barbing (DE)

(73) Assignee: BAYER CROPSCIENCE AG, Monheim am Rhein (DE)

( * ) Notice: Subject to any disclaimer, the term of this patent is extended or adjusted under 35 U.S.C. 154(b) by 85 days.

(21) Appl. No.: 14/412,297

(22) PCT Filed: Jun. 28, 2013

(86) PCT No.: PCT/EP2013/063701
§ 371 (c)(1),
(2) Date: Dec. 31, 2014

(87) PCT Pub. No.: WO2014/005951
PCT Pub. Date: Jan. 9, 2014

(65) Prior Publication Data
US 2015/0166321 A1    Jun. 18, 2015

(30) Foreign Application Priority Data

Jul. 3, 2012  (EP) ..................... 12174792

(51) Int. Cl.
*B67D 7/02* (2010.01)
*F16L 37/14* (2006.01)
(Continued)

(52) U.S. Cl.
CPC ............. *B67D 7/0288* (2013.01); *B67D 7/06* (2013.01); *F16L 37/144* (2013.01); *F16L 37/30* (2013.01)

(58) Field of Classification Search
CPC ...... B67D 7/06; B67D 7/0288; B67D 7/0294; B67D 1/0835; B67D 3/02; B67D 3/045; B67D 3/0025; F16L 37/30; F16L 37/144
(Continued)

(56) References Cited

U.S. PATENT DOCUMENTS 3,885,608 A * 5/1975 Ayres ................. B67D 7/38
                                                      137/383
4,730,773 A * 3/1988 Meyer ................ B05B 15/00
                                                    137/15.01
(Continued)

FOREIGN PATENT DOCUMENTS

DE         69633403 T2    3/2005
DE      202009016419 U1    4/2011
(Continued)

OTHER PUBLICATIONS

International Search Report from corresponding PCT/EP2013/063701, dated Sep. 30, 2013.

*Primary Examiner* — Timothy L Maust
*Assistant Examiner* — Andrew StClair
(74) *Attorney, Agent, or Firm* — McBee Moore Woodward & Vanik IP, LLC

(57) ABSTRACT

A device for the contamination-free filling of a tank from a canister is provided.

17 Claims, 10 Drawing Sheets

(51) Int. Cl.
*F16L 37/30* (2006.01)
*B67D 7/06* (2010.01)

(58) Field of Classification Search
USPC .............. 137/614.03–614.06; 251/149–149.7
See application file for complete search history.

(56) References Cited

U.S. PATENT DOCUMENTS

| | | | | |
|---|---|---|---|---|
| 5,311,899 | A * | 5/1994 | Isayama | F16L 37/42 137/240 |
| 5,628,344 | A * | 5/1997 | Roberts | F16L 37/20 137/614 |
| 2003/0201017 | A1 | 10/2003 | Knuthson | |
| 2008/0035222 | A1 * | 2/2008 | Fraser | F16K 17/40 137/614.04 |
| 2009/0212076 | A1 * | 8/2009 | Fertig | B65D 77/0466 222/333 |
| 2012/0192973 | A1 * | 8/2012 | Klepach | B67D 7/0294 137/560 |
| 2012/0234415 | A1 * | 9/2012 | Cardi | F16L 37/56 137/614.04 |

FOREIGN PATENT DOCUMENTS

| | | | | | |
|---|---|---|---|---|---|
| FR | CA 2484531 | A1 * | 5/2005 | ............ | F16L 37/086 |
| GB | 1288764 | A | 9/1972 | | |
| GB | 2097082 | A | 10/1982 | | |
| GB | 2231632 | A | 11/1990 | | |
| WO | 9715780 | A1 | 5/1997 | | |

* cited by examiner

DEVICE FOR THE CONTAMINATION-FREE FILLING OF A TANK FROM A CANISTER

CROSS REFERENCE TO RELATED APPLICATIONS

This application is a §371 National Stage Application of PCT/EP2013/063701, filed Jun. 28,2013, which claims priority to EP 12174792.7, filed Jul. 3, 2012.

BACKGROUND

Field of the Invention

The invention relates to a device for the contamination-free filling of a tank from a canister, for example for decanting liquid pesticides from small containers (canisters, bottles or the like) into other, larger containers, such as barrels or tanks.

Description of Related Art

Document WO 97/15780 relates to a gas fueling device for gas-operated vehicles. As viewed in the longitudinal direction, the gas fueling device is divided into a plurality of chamber-like passages (compartments). The compartments which follow one another together form the main channel of the device. The first compartment of the fueling device which is connected to the gas supply tank has, in addition to the central main channel which guides the gas flow, a laterally arranged additional channel with a smaller cross section. That end section of the gas fueling device which lies opposite the first compartment is connected to the vehicle tank. The residual quantities of gas which have not been transferred into the vehicle tank after termination of the fueling operation and first of all collect in the gas fueling device are discharged from the device again through the additional channel with a smaller cross section and are returned to a recycling tank. The additional channel which is disclosed in WO 97/15780 extends merely over the first compartment of the device. Flushing of the entire device with the utilization of the additional channel by the introduction of water as cleaning liquid into the additional channel is not possible and, in a manner which corresponds to the purpose of the fueling device, is also not provided. The flushing of the tank which is connected to the second end section of the fueling device (that is to say, the flushing of the vehicle tank) is also not possible in the gas fueling device which is disclosed in WO 97/15780.

Document GB 1 288 764 A relates to a valve for a barrel for storing beverages, in particular beverages which contain carbon dioxide. The valve has a plurality of openings which extend in the radial direction and serve as ventilating openings. During filling of the barrel, the residual air which remains in the valve is displaced through the openings. The flushing of the valve for cleaning purposes and the flushing of the barrel with a cleaning liquid using the ventilating openings is not provided and would also not be possible in the device which is disclosed in GB 1 288 764 A.

Document GB 2 231 632 A discloses a hydraulic coupling with pressure equalization, which hydraulic coupling is suitable for use in deep sea drilling. The coupling sections which are to be connected have channels which are oriented in the radial direction and channels which are oriented in the longitudinal direction. The channels bring about the distribution of the hydraulic pressure which loads the valve constituent parts, and facilitate the establishing of a fluid connection between two hydraulic lines, while the coupling sections of the two lines are connected to one another.

Document GB 2 097 082 A discloses a valve for containers which are pressurized. Whereas the removal of the gas as a rule tends to take place slowly, the filling of the containers is supposed rather to proceed rapidly. For the purpose of gas removal, the valve contains additional elements which produce an additional passage (bypass) in addition to the main opening of the valve.

In the known abovementioned valve devices, in a manner which corresponds to their construction, the cleaning of the inner valve constituent parts in order to protect the user against contamination during partial removals is not provided. In particular, the separation of the contact faces which lie in the interior of the valve devices and in each case belong to two different valve constituent parts which are connected to one another is not possible in the known abovementioned devices for the purpose of flushing of the inner valve constituent parts after partial removal or after complete removal.

The concluding flushing of a tank (canister) which is connected to one of the known abovementioned valve devices would likewise not be capable of being carried out after complete removal of the tank contents on account of the construction of said valve devices.

In the devices which are already known for the contamination-free filling of a tank from a canister, particular emphasis is placed on the fact that the user can carry out the exact filling or metering, without coming into contact with the fluid to be transferred in the process. Transfer systems of this type are known, for example, from DE 20 2009 016 419 U1 and DE 696 33 403 T2. A further essential function consists in the fact that, after complete emptying, the canister can be flushed with a cleaning liquid, for example water.

Devices of this type usually consist of a tank adapter with a tank fastening flange for fastening to a tank, and a first coupling part, and a canister adapter with a canister fastening flange for fastening to a canister, and a second coupling part, the tank adapter and the canister adapter being connected releasably to one another via the first and second coupling part.

Furthermore, it is known from practice to additionally mount a separate flushing module, in order to clean the completely emptied canister with a cleaning liquid. In this way, the user and the environment are protected reliably against contact with the fluid to be transferred in the case of complete emptying of the canister. However, the situation in the case of partial removals remains a problem when the canister which is still filled with a residual amount is removed from the tank to be filled.

SUMMARY

The invention is therefore based on the object of improving the protection of the user against contamination, even in the case of partial removal.

In particular, the object consists of cleaning as completely as possible the constituent parts which lie in the interior of the valve devices and the contact faces which are formed between said constituent parts after a partial removal or after complete removal of the canister contents, it being intended that, in addition to the valve constituent parts, the canister is also flushed on the inner side in the case of complete removal.

According to the invention, this object is achieved by way of the features of claim 1.

The device according to the invention for the contamination-free filling of a tank from a canister has substantially the following features:

a. a tank adapter with a tank fastening flange for fastening to the tank, and a first coupling part,
b. a canister adapter with a canister fastening flange for fastening to the canister, and a second coupling part, the tank adapter and the canister adapter being connected releasably to one another via the first and the second coupling part, and
c. a flushing connector for feeding in cleaning liquid, which flushing connector is attached to the tank adapter, the device providing a fluid connection between the canister fastening flange and the tank fastening flange in an open position and closing the fluid connection between the canister fastening flange and the tank fastening flange in a closed position.

As a result of the accommodation of the flushing connector on the tank adapter, there is the option to flush the connecting region between the tank adapter and the canister adapter both when the canister is completely emptied and in the case of a partial removal.

The provision of the flushing connector on the tank adapter has the advantage, moreover, that the canister adapter has a correspondingly lower weight. This in turn simplifies the handling for the user, since he/she usually first of all screws the canister adapter onto the canister and then couples said unit comprising canister and canister adapter to the tank adapter. It is also conceivable within the context of the invention that the canister adapter is a fixed constituent part of the canister. It is therefore advantageous if the canister adapter is constructed in as inexpensive a way as possible.

Further refinements of the invention are the subject matter of the subclaims.

DETAILED DESCRIPTION OF A PREFERRED EMBODIMENT

Figure 1:
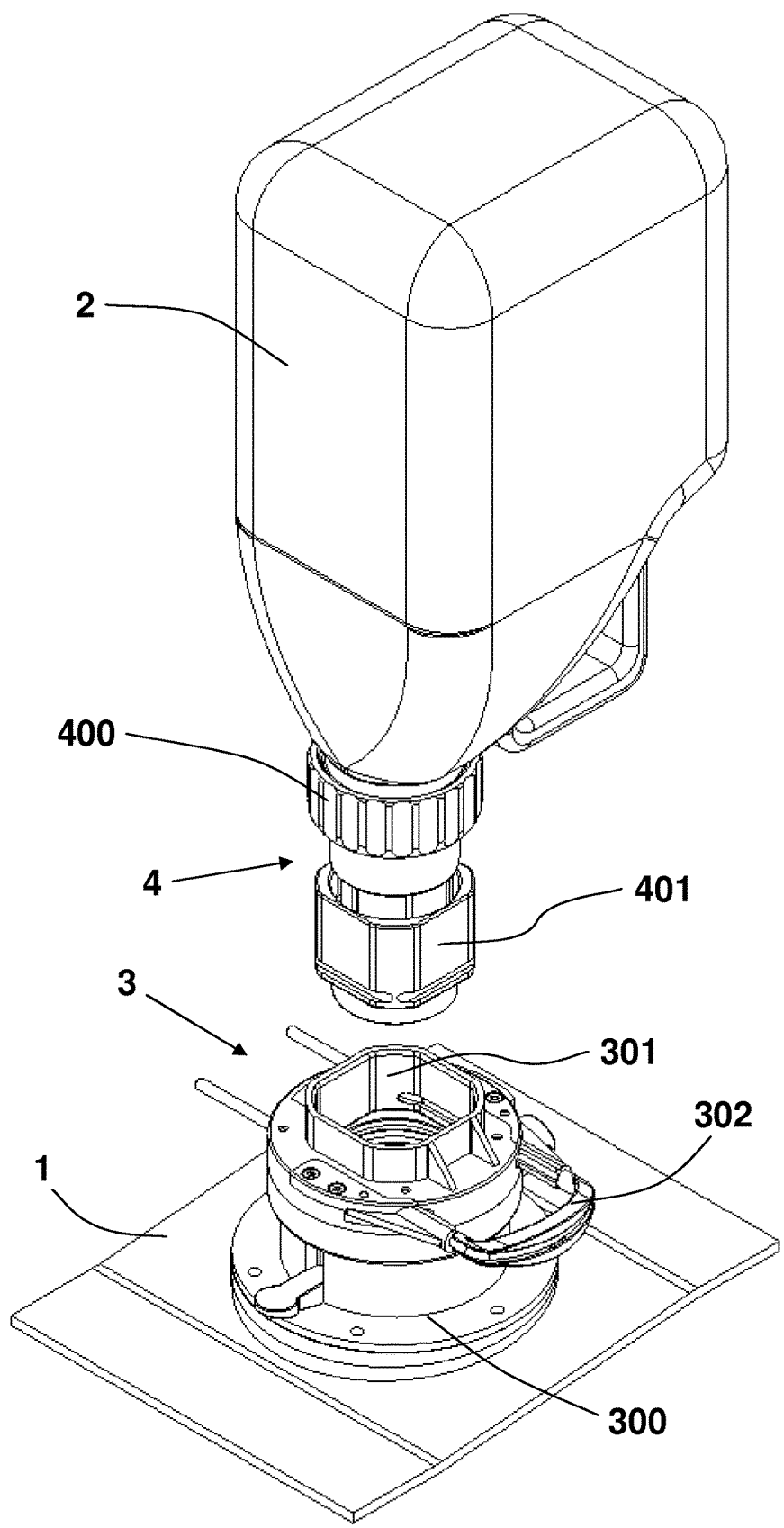
FIGS. 1-10 represents embodiments described herein.

According to one special refinement of the invention, the first and the second coupling part are configured in such a way that, in the open position of the device, they provide a first fluid connection between the canister fastening flange and the tank fastening flange and a second fluid connection which can be shut off between the flushing connector and the canister fastening flange.

At least one sealing element can be provided on the first or second coupling part for the fluid-tight connection of the tank adapter and the canister adapter. According to a further refinement of the invention, a closing piston is guided in the canister adapter, which closing piston can be adjusted between the open position and the closed position via an actuating element. Said closing piston can have an inner channel which provides the second fluid connection between the flushing connector and the canister fastening flange in the open position of the device. Furthermore, the canister adapter can have an outer channel which is arranged around the closing piston and, in the open position, represents part of the first fluid connection between the canister fastening flange and the tank fastening flange.

Furthermore, the closing piston can have a first contact face which is in operative contact with a second contact face which is provided on the tank adapter when the second coupling part of the canister adapter is coupled to the first coupling part of the tank adapter. According to one preferred refinement of the invention, it is provided that the inner channel of the closing piston opens with one end in the first contact face and is connected by way of its other end to the canister fastening flange, and the tank adapter has a closable connecting channel which opens with one end in the second contact face and is connected by way of its other end to the flushing connector, the connecting channel which opens in the second contact face and the inner channel of the closing piston which opens in the first contact face being connected to one another when the tank adapter and the canister adapter are in contact with one another via the two contact faces. It is expedient here if at least one seal is provided between the two contact faces.

According to a further refinement of the invention, the closing piston is guided in a slotted guide on the canister adapter, a rotation of the canister adapter bringing about a displacement of the closing piston relative to the canister adapter. It can be provided, furthermore, that the second coupling part of the tank adapter is secured rotatably on the tank adapter by way of an actuating element. In a further refinement, the first contact face of the closing piston is in fixed contact with the second contact face on the tank adapter so as to rotate with it when the second coupling part of the canister adapter is coupled to the first coupling part of the tank adapter, a subsequent rotation of the second coupling part relative to the tank adapter bringing about a displacement of the closing piston relative to the canister adapter.

It is provided, furthermore, that the first contact face of the closing piston is in contact with the second contact face on the tank adapter when the second coupling part of the canister adapter is coupled to the first coupling part of the tank adapter, and the second contact face being secured on the tank adapter such that it can be displaced in the movement direction of the closing piston, and a spring element pressing the second contact face against the first contact face. The displacement or raising of the second contact face from the first contact face can take place by way of a further actuating element, while the second coupling part of the canister adapter is coupled to the first coupling part of the tank adapter. In this way, additional flushing or cleaning of the two contact faces with a cleaning liquid which is fed in via the flushing connector is possible.

Canisters, in particular those which contain pesticides, are closed by way of a sealing film in the region of the outlet before first usage. Sealing films of this type are frequently removed manually by the user, skin contact with the fluid or any protective glove rapidly occurring. In one preferred refinement of the invention, the canister adapter is therefore provided with an integrated film cutting element in the region of the canister fastening flange for cutting open the sealing film of the canister. Here, the film cutting element can be formed by a toothed rim which is oriented, in particular, obliquely with respect to the longitudinal center axis of the canister adapter. Furthermore, the canister adapter can have a sliding sleeve, to which the canister fastening flange is fastened, the sliding sleeve being axially displaceable relative to the film cutting element.

As a result of the integrated film cutting element, the user therefore does not have to remove the sealing film himself/herself, but rather merely screws the canister adapter open with the aid of the fastening flange to the outlet opening of the canister. The sealing film is either cut open automatically by way of this screwing-in operation, or the opening takes place only after the screwing-open operation, by the film cutting element being brought into contact with the sealing film by means of the sliding sleeve, in order to open said sealing film.

The above-described device for the contamination-free filling of a tank from a canister is distinguished by improved protection of the user against any contact with the fluid which is situated in the canister. Here, not only the flushing of an emptied canister, but rather also the flushing of the contact regions between the tank adapter and the canister adapter in the case of partial removal are made possible by way of the flushing connector.

Moreover, the integrated film cutting element ensures that contact with the fluid to be transferred is prevented reliably even during the attachment of the canister adapter to the canister and/or during coupling to the tank adapter.

In addition to the above description, the features of the subject matter of the invention will be summarized once more by way of the following clauses:

1. A device for the contamination-free filling of a tank (1) from a canister (2) having
   a. a tank adapter (3) with a tank fastening flange (300) for fastening to the tank, and a first coupling part (301),
   b. a canister adapter (4) with a canister fastening flange (400) for fastening to the canister (2), and a second coupling part (401),
   the tank adapter (3) and the canister adapter (4) being connected releasably to one another via the first and the second coupling parts (301, 401), and
   c. a flushing connector (308) for feeding in cleaning liquid (6), which flushing connector (308) is attached to the tank adapter (3),
   the device providing a fluid connection between the canister fastening flange (400) and the tank fastening flange (300) in an open position and closing the fluid connection between the canister fastening flange (400) and the tank fastening flange (300) in a closed position.
2. The device according to clause 1, characterized in that, in the open position of the device, the first and the second coupling part (301, 401) provide a first fluid connection between the canister fastening flange (400) and the tank fastening flange (300) and a second fluid connection which can be shut off between the flushing connector (308) and the canister fastening flange (400).
3. The device according to clause 1, characterized in that at least one sealing element (303, 306b, 410) is provided on the first or second coupling part (301, 401) for the fluid-tight connection of the tank adapter (3) and the canister adapter (4).
4. The device according to clause 1, characterized in that a closing piston (409) is guided in the canister adapter (4), which closing piston (409) can be adjusted between the open position and the closed position via an actuating element (302).
5. The device according to clause 4, characterized in that the closing piston (409) has an inner channel (409c) which provides a fluid connection between the flushing connector (308) and the canister fastening flange (400) in the open position of the device.
6. The device according to clause 4, characterized in that the canister adapter (4) has an outer channel (413) which is arranged around the closing piston (409) and, in the open position, represents part of the fluid connection between the canister fastening flange (400) and the tank fastening flange (300).
7. The device according to clause 4, characterized in that the closing piston (409) has a first contact face (409a) which is in operative contact with a second contact face (306a) which is provided on the tank adapter (3) when the second coupling part (401) of the canister adapter (4) is coupled to the first coupling part (301) of the tank adapter (3).
8. The device according to clauses 5 and 7, characterized in that the inner channel (409c) of the closing piston (409) opens with one end in the first contact face (409a) and is connected by way of its other end to the canister fastening flange (400), and the tank adapter (3) has a closable connecting channel (311) which opens with one end in the second contact face (306a) and is connected by way of its other end to the flushing connector (308), the connecting channel (311) which opens in the second contact face (306a) and the inner channel (409c) of the closing piston (409) which opens in the first contact face (409a) being connected to one another when the tank adapter (3) and the canister adapter (4) are in contact with one another via the two contact faces.
9. The device according to clause 7, characterized in that a seal (306b) is provided between the two contact faces (306a, 409a).
10. The device according to clause 4, characterized in that the closing piston (409) is guided in a slotted guide (412) on the canister adapter (4), a rotation of the canister adapter (4) with respect to the closing piston (409) bringing about a displacement of the closing piston (409) relative to the canister adapter (4).
11. The device according to clause 1, characterized in that the first coupling part (301) of the tank adapter (3) is secured rotatably on the tank adapter by way of an actuating element (302).
12. The device according to clauses 7 and 11, characterized in that the first contact face (409a) of the closing piston (409) is in fixed contact with the second contact face (306a) on the tank adapter (3) so as to rotate with it when the second coupling part (401) of the canister adapter (4) is coupled to the first coupling part (301) of the tank adapter (3), and a subsequent rotation of the second coupling part (401) relative to the tank adapter (3) bringing about a displacement of the closing piston (409) relative to the canister adapter (4).
13. The device according to clause 7, characterized in that the first contact face (409a) of the closing piston (409) is in contact with the second contact face (306a) on the tank adapter (3) when the second coupling part (401) of the canister adapter (4) is coupled to the first coupling part (301) of the tank adapter (3), and the second contact face (306a) being secured on the tank adapter (3) such that it can be displaced in the movement direction of the closing piston (409), and a spring element (304) pressing the second contact face (306a) against the first contact face (409a).
14. The device according to clause 7, characterized by an actuating element (315) for raising up the second contact face (306a) from the first contact face (409a), while the second coupling part (401) of the canister adapter (4) is coupled to the first coupling part (301) of the tank adapter (3).
15. The device according to clause 1, characterized in that the canister adapter (4) has a film cutting element (404) in the region of the canister fastening flange (400) for cutting open a sealing film (203) of the canister (2).
16. The device according to clause 15, characterized in that the film cutting element (404) is formed by a toothed rim.
17. The device according to clause 15, characterized in that the canister adapter (4) has a sliding sleeve (405), to which the canister fastening flange (400) fastens, the sliding sleeve (405) being axially displaceable relative to the film cutting element (404).

18. The device according to clause 1, characterized in that the canister fastening flange (400) is a constituent part of the canister (2).

19. The device according to clause 1, characterized in that a flushing or closure cover (9) is provided which can be coupled to the tank adapter (3) instead of the canister adapter (4) and closes the tank adapter (3) to the outside.

Figure 2:
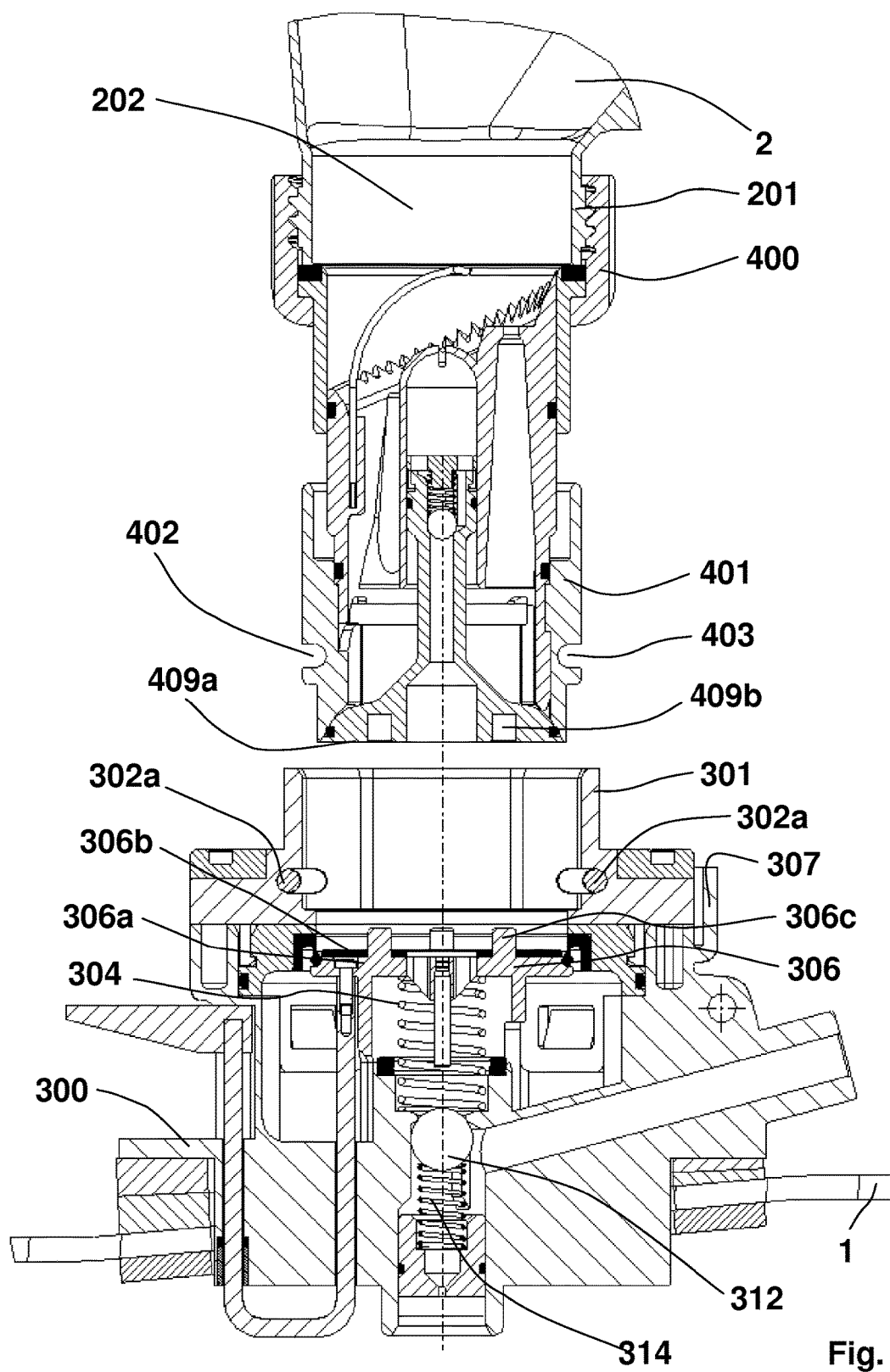
Figure 3:
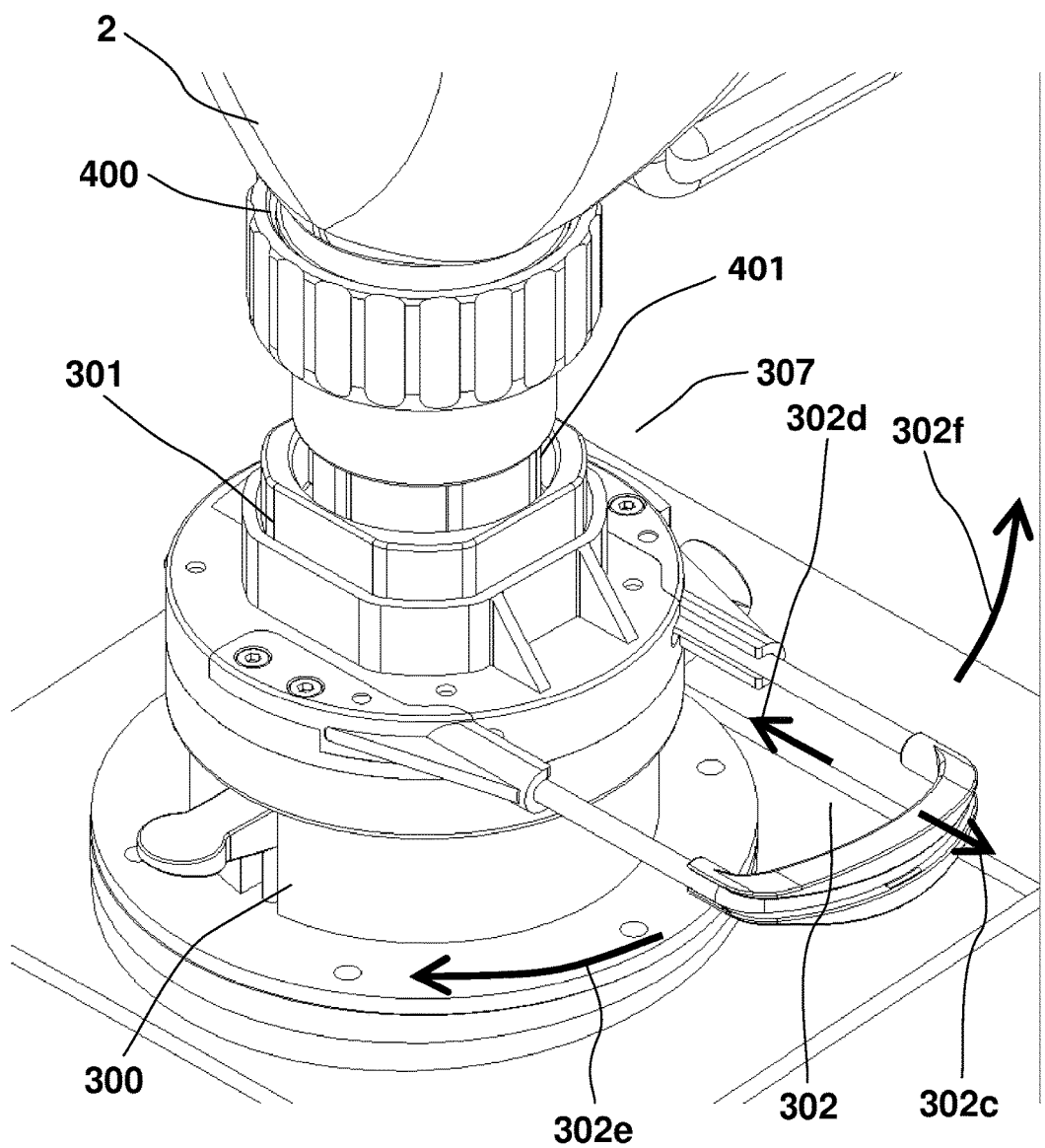
Figure 4:
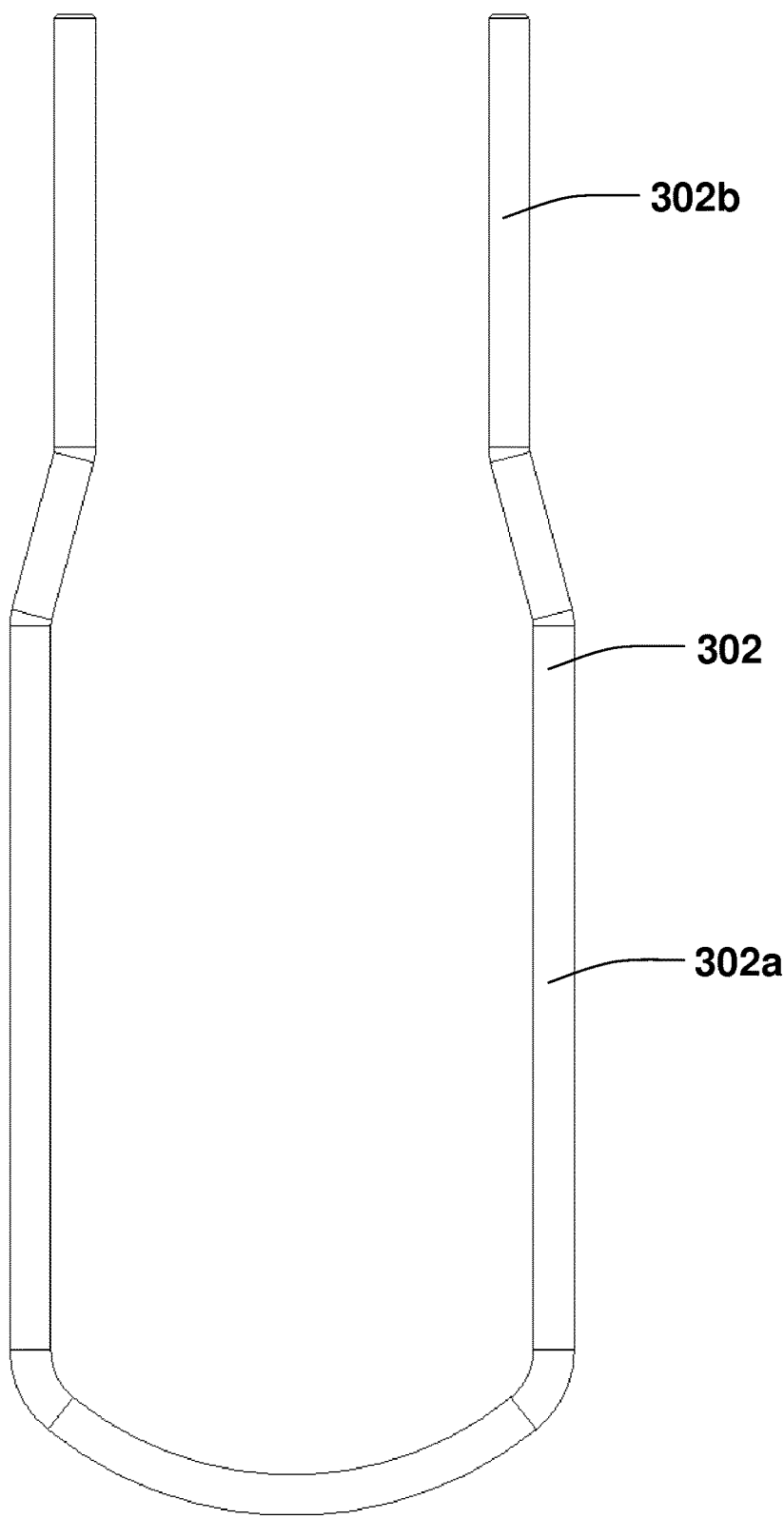
Figure 5:
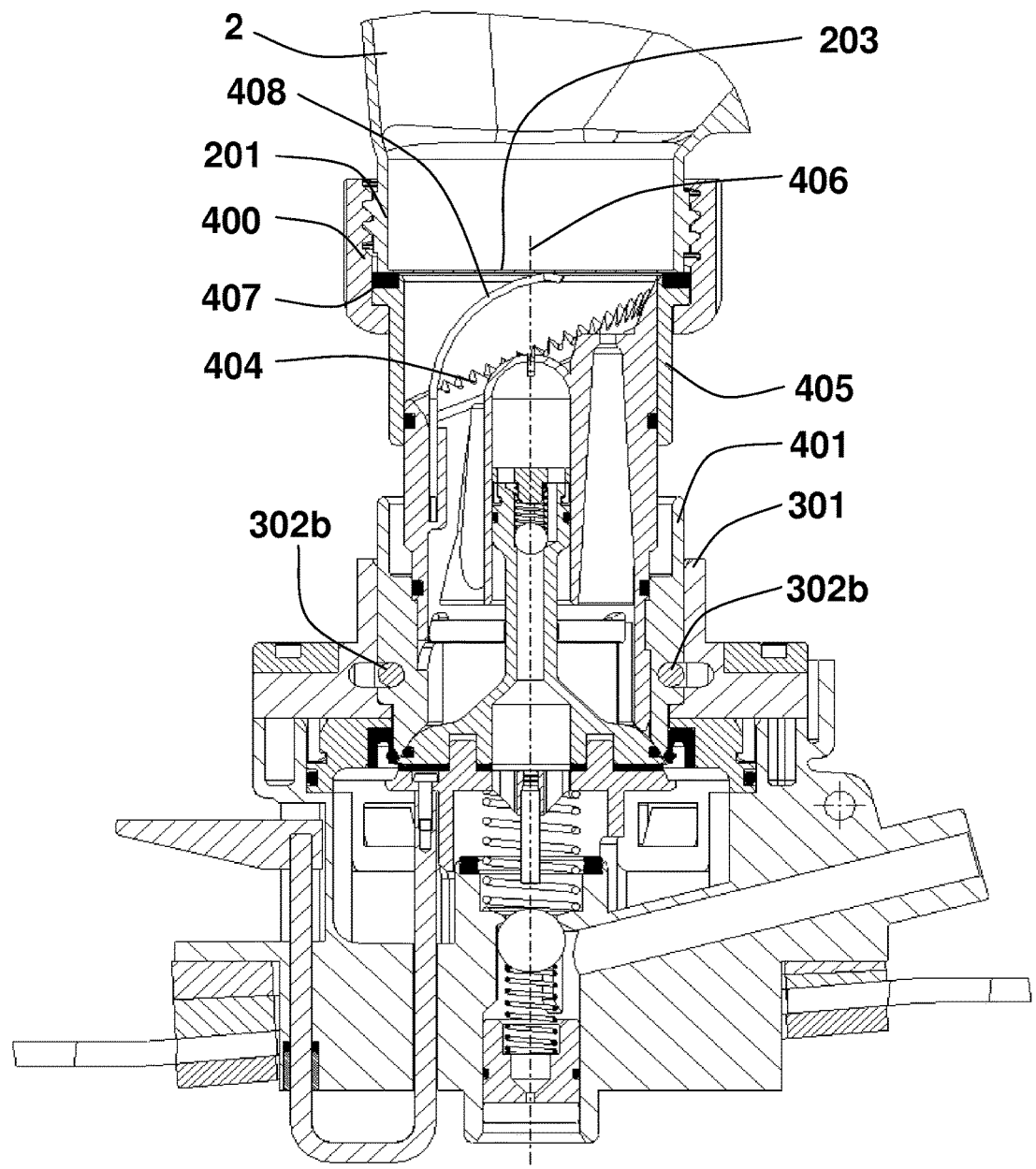
Figure 6:
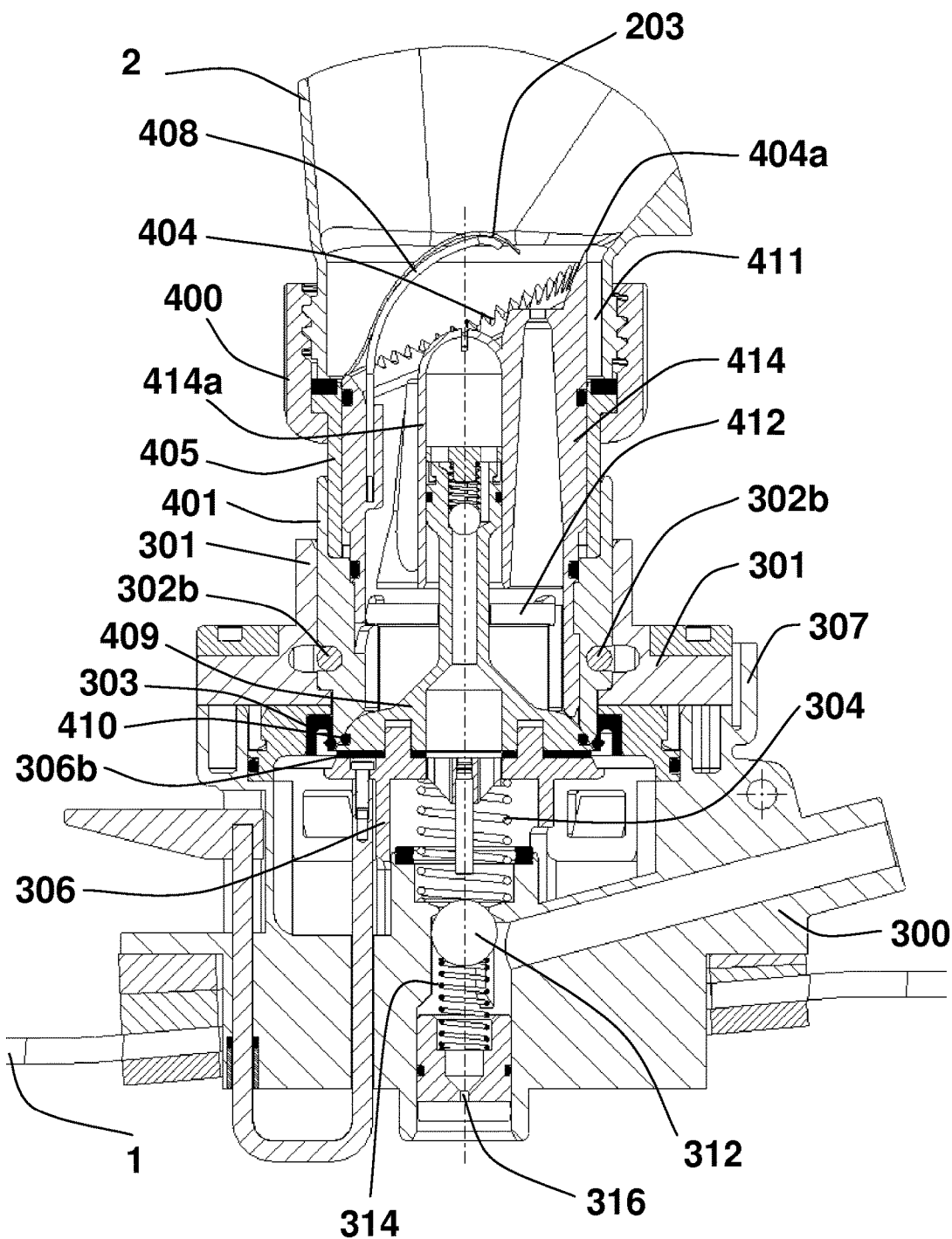
Figure 7:
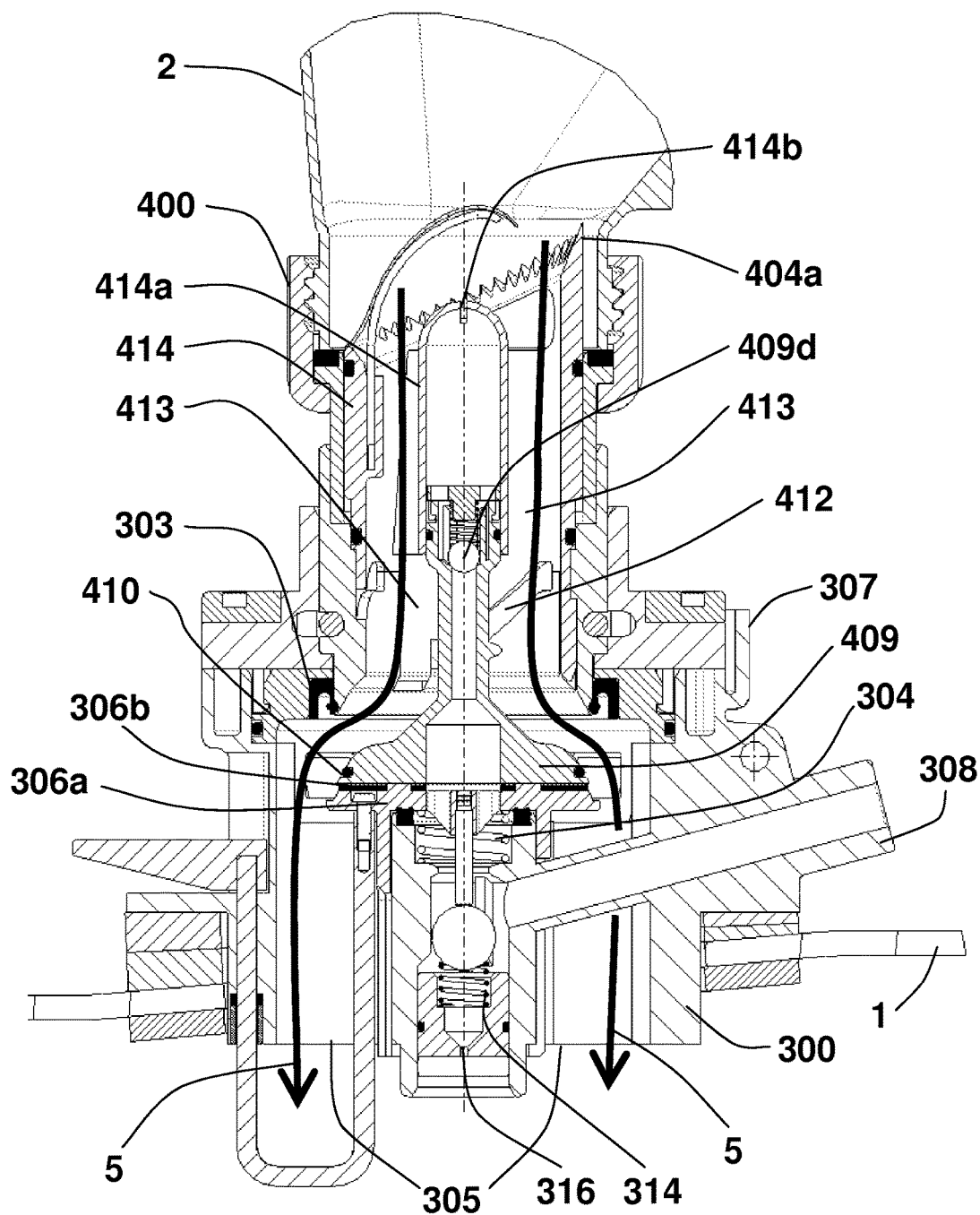
Figure 8:
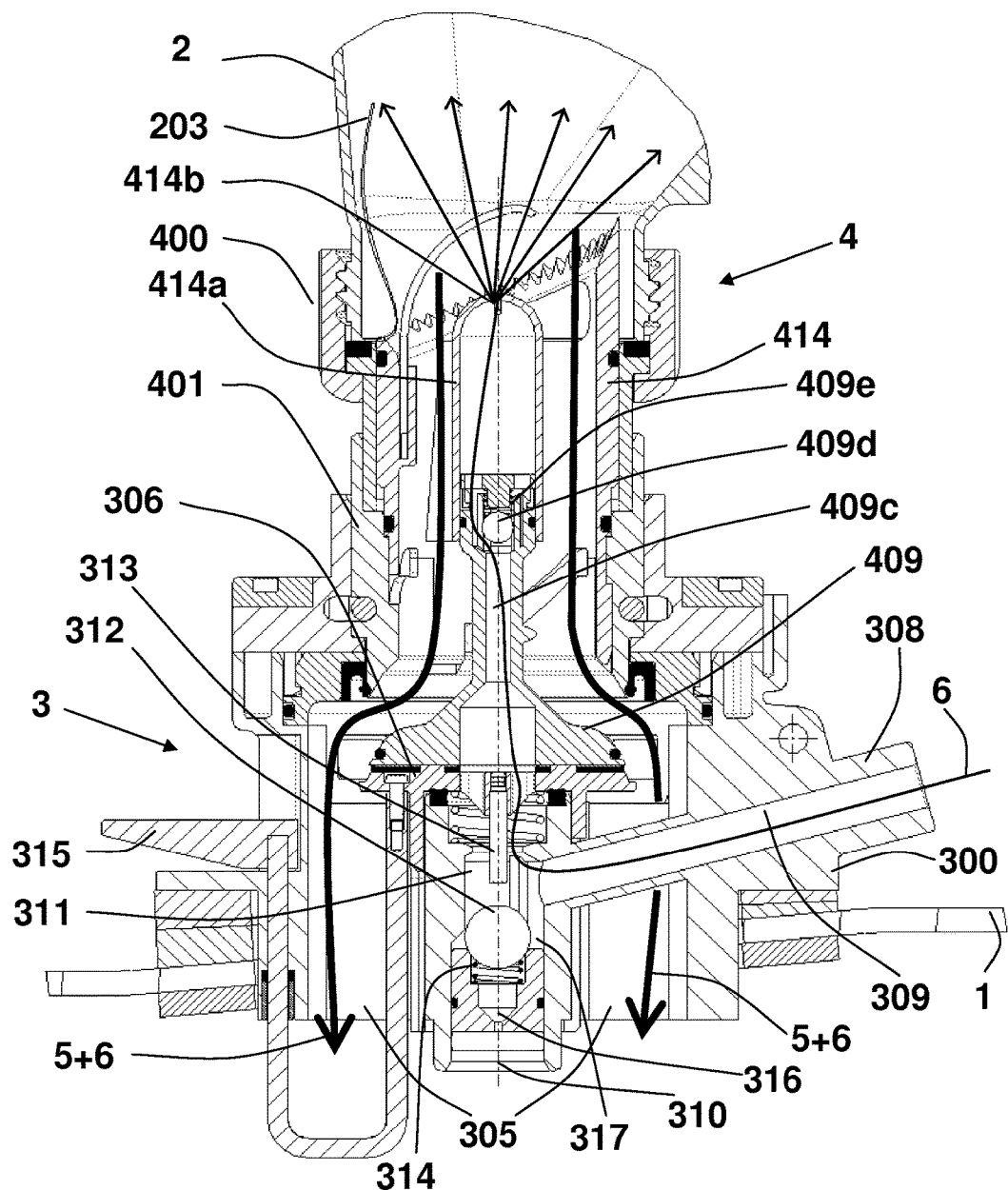
Figure 9:
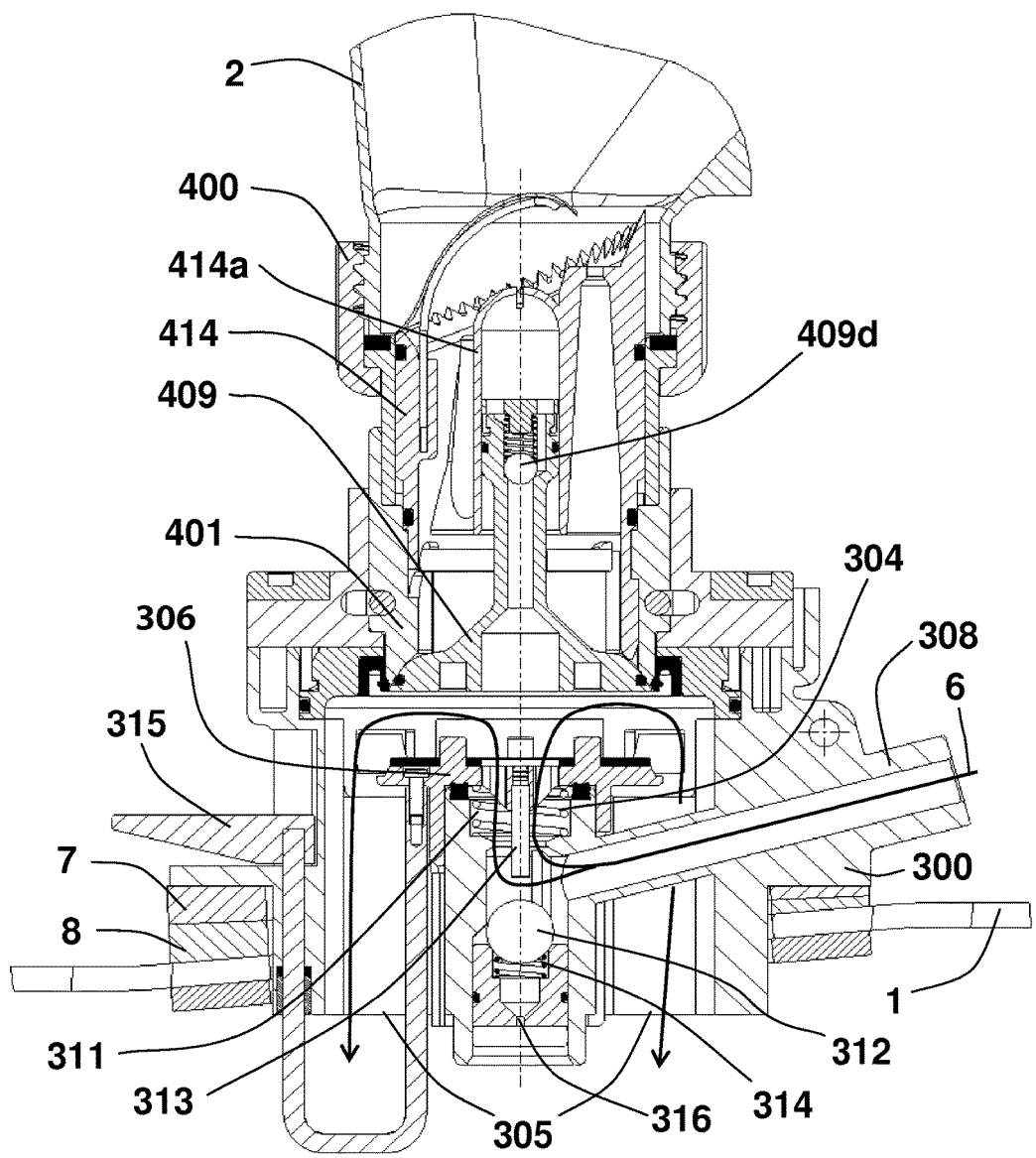
Figure 10:
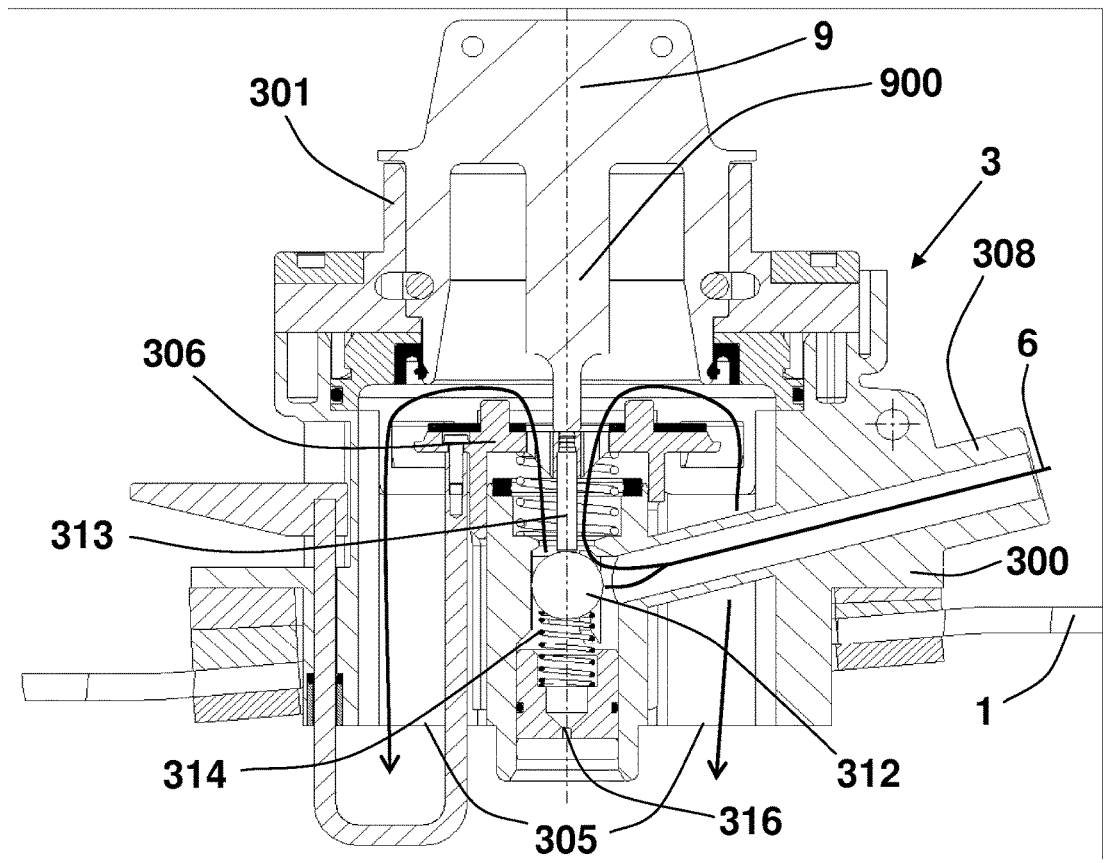

In the following text, one exemplary embodiment of the invention will be explained in greater detail using the drawing, in which:

FIG. 1 shows a three-dimensional illustration before the connection of a canister to a tank, FIG. 2 shows a sectional illustration of the tank adapter and the canister adapter before they are coupled, FIG. 3 shows a three-dimensional illustration in the coupled state of the tank adapter and the canister adapter, FIG. 4 shows a plan view of the actuating element for locking the canister adapter to the tank adapter and for rotating the second coupling part of the tank adapter, FIG. 5 shows a sectional illustration of the device according to the invention in the closed position and before the sealing film is opened, FIG. 6 shows a sectional illustration of the device according to the invention in the closed position and after the sealing film is opened, FIG. 7 shows a sectional illustration of the device in the open position between the canister fastening flange and the tank fastening flange, FIG. 8 shows a sectional illustration of the device during the flushing of the canister, FIG. 9 shows a sectional illustration of the device during the flushing of the contact faces, and FIG. 10 shows a diagrammatic illustration of the device, in which, instead of the canister adapter, the tank adapter is closed by way of a flushing or closure cover.

FIGS. 1 and 2 show a device for the contamination-free filling of a tank 1 from a canister 2 before the canister is coupled to the tank. The device has a tank adapter 3 with a tank fastening flange 300 for fastening to the tank 1, and a first coupling part 301, and a canister adapter 4 with a canister fastening flange 400 for fastening to the canister 2, and a second coupling part 401. Here, the canister fastening flange 400 is configured as a union nut which interacts with an external thread 201 of an opening 202 of the canister 2. Two wedge plates 7, 8 which can be rotated with respect to one another are provided for fastening the tank adapter 3 to the tank 1 (see FIG. 9), with the aid of which wedge plates 7, 8 the tank adapter can be mounted exactly vertically to a certain extent even on inclined faces.

The second coupling part 401 of the canister adapter 4 has an octagonal external cross section which is of complementary configuration with respect to the first coupling part 301 of the tank adapter 3. When the two adapters are plugged together, the second coupling part 401 is plugged into the first coupling part 301, as is apparent from FIGS. 3 and 5. An actuating element 302 which is configured as a securing clip serves for fixing/locking the second coupling part 401 in the first coupling part 301 by being pulled in the direction of the arrow 302c. The actuating element 302 is of approximately U-shaped configuration, the two limbs being of inwardly bent-over configuration in the front limb regions 302b with respect to the remaining limb regions 302a. In order to introduce the canister adapter into the tank adapter, the actuating element 302 is situated with its limb regions 302a in the region of the first coupling part 301, with the result that the canister adapter 4 can be introduced. By way of the actuating element 302 being pulled in the direction of the arrow 302c, the limb regions 302b are displaced into the region of the first coupling part 301 and come into engagement there with grooves 402 and 403 which are formed on the canister adapter 4, and in this way lock the canister adapter in the tank adapter. In order to release the two adapters, the fastening element 302 is pushed into the tank adapter 3 in the direction of the arrow 302d, with the result that the limb regions 302b again release the canister adapter 4. The two different sliding positions of the actuating element 302 can be seen by way of the limb regions 302a in FIG. 2 and the limb regions 302b in FIG. 5.

The canister adapter 4 has an integrated film cutting element 404 which, in the exemplary embodiment which is shown, is formed by a toothed rim which is oriented obliquely with respect to the longitudinal center axis of the canister adapter. The function of the film cutting element 404 will be explained in greater detail in the following text using FIGS. 5 and 6. The canister fastening flange 400 is attached on a sliding sleeve 405 which can be displaced relative to the canister adapter 4 and, in particular, relative to the film cutting element 404 in the direction of the longitudinal center axis 406 of the canister adapter 4.

The canister 2 is usually closed by way of a sealing film 203, it being possible for the canister fastening flange 400 to be screwed onto the external thread 201 of the canister 200 in the position of the sliding sleeve according to FIG. 5, without the sealing film 203 being broken open in the process. Here, the film cutting element 404 is situated in the interior of the sliding sleeve 405. It is reliably prevented in this way that the fluid which is situated in the canister 5 can escape. The canister fastening flange is screwed in a liquid-tight manner on the canister 2 by way of a seal 407 which is provided between the canister 2 and the canister adapter 4. The canister 2 with the canister adapter 4 which is screwed onto it is then coupled to the tank adapter.

The sliding sleeve 405 is only then pushed downward into the position which is shown in FIG. 6, the canister 2 also moving which is fastened fixedly to the sliding sleeve 405 via the canister fastening flange 400. Here, the toothed rim of the film cutting element 404 successively severs the sealing film 203. A spring clip 408 which is prestressed by way of the canister being screwed on presses the sealing film 203 into the canister 2 and therefore keeps the connection open between the canister 2 and the canister adapter 4. The sealing film is severed by way of the film cutting element 404 apart from a small region behind the spring clip 408 as a result of this axial displacement of the sliding sleeve 4.

The advantage of the toothed rim over a continuous cutting surface lies in the pressure which is considerably higher in a punctiform manner and immediately leads to a tearing of the sealing film at the tooth contact point. Excessive stretching of the sealing film therefore does not occur. As a result, even elastic films can be opened satisfactorily, even in the case of a large cutting gap 411. The opening behavior can be improved even further if the uppermost tooth 404a of the film cutting element 404 is of somewhat larger and, above all, projecting configuration. In this way, an initial perforation first of all takes place by way of the entire axial force, with the result that the further cutting open of the sealing film is facilitated.

The device for the contamination-free filling of the tank 1 from the canister 2 has a closed position which is shown in FIG. 6 and in which the fluid connection between the canister fastening flange 400 and the tank fastening flange 300 is closed, and an open position which is shown in FIG.

7 and in which a first fluid connection between the canister fastening flange and the tank fastening flange is provided. In the exemplary embodiment which is shown, a closing piston 409 which is guided in the canister adapter 4 is provided in order to realize said two positions of the device. The sealing of the closing piston 409 with respect to the second coupling part 401 of the canister adapter 4 takes place via an O-ring 410. Furthermore, the second coupling part 401 of the canister adapter 4 is sealed radially with respect to the tank fastening flange 300 via a sealing element 303. The closing piston 409 is pressed into the closed position which is shown in FIG. 6 via a spring element 304 which is arranged in the tank adapter 3 and is configured as a helical spring.

The closing piston 409 is guided by way of a slotted guide 412 on the canister adapter 4, a rotation of the closing piston 409 with respect to the canister adapter 4 bringing about a displacement of the closing piston relative to the canister adapter between the two positions which are shown in FIG. 6 and FIG. 7. The rotation of the closing piston and therefore the axial displacement of the closing piston relative to the canister adapter 4 likewise take place via the actuating element 302, the latter being rotated in the direction of the arrows 302e and 302f.

To this end, the first coupling part 301 of the tank adapter 3 which is coupled to the canister adapter 4 can be rotated relative to the tank fastening flange 300 via the actuating element 302. The rotary angle is limited by way of stops and is, for example, 30°. Depending on the rotary position of the first coupling part 301, the closing piston is situated either in the closed position according to FIG. 6, in the open position according to FIG. 7 or in an intermediate position. The canister adapter 4 has an outer channel 413 which is arranged around the closing piston 409 and, in the open position according to FIG. 7, represents part of the first fluid connection between the canister fastening flange 400 and the tank fastening flange 300. The flow of the fluid 5 is indicated by way of arrows in FIG. 7.

The film cutting element 404 is arranged on a bush 414 which provides an inner guide sleeve 414a, in which that end of the closing piston 409 which faces the canister 2 is guided in a slidingly displaceable manner. In this region, the outer channel 413 of the canister adapter 4 is formed by way of the annular space which is formed between the bush 414 and the guide sleeve 414a. The tank fastening flange 300 is provided with at least one outlet opening 305 in its region which protrudes into the tank 1, via which outlet opening 305 the fluid 5 passes from the canister 2 into the tank 1.

Moreover, the closing piston 409 has a first contact face 409a (see FIG. 2) which interacts with a second contact face 306a which is provided on the tank adapter 3 on a sliding sleeve 306 when the second coupling part 401 of the canister adapter 4 is coupled to the first coupling part 301 of the tank adapter 3 according to FIG. 6. A seal 306b is provided between the two contact faces 409a and 306a. Here, the sliding sleeve 306 is pressed against the closing piston 409 via the spring element 304. The two contact faces 409a, 306a engage into one another in such a way that a rotation of the closing piston 309 with respect to the sliding sleeve 306 is prevented. To this end, the second contact face 306 is provided with journals 306c which engage into cutouts 409b of correspondingly complementary configuration on the closing piston 409, in each case four holes and cutouts preferably being provided which are arranged in the corners of a square. Moreover, the sliding sleeve 306 is secured in the tank adapter 3 such that it can be displaced axially but is fixed rotationally. As a result of this construction, the closing piston 409 cannot rotate with respect to the tank adapter 3. However, a rotation of the actuating element 302 brings about a rotation of the canister adapter, with the result that an axial displacement of the closing piston 409 occurs as a result of the slotted guide 412, from the closed position which is shown in FIG. 6 into the open position which is shown in FIG. 7. Here, the sliding sleeve 306 is pressed into the tank adapter counter to the pressure of the spring element 304.

The slotted guide 412 preferably runs horizontally at its upper and lower end, with the result that the closing piston 409 is locked in each case in the open (FIG. 7) and closed (FIG. 6) state. The emptying speed can be controlled as desired via the rotary angle of the actuating element 302 and therefore via the opening travel of the closing piston 409. A stop bar 307 on the tank adapter 3 prevents the actuating element 302 being pressed in the direction of the arrow 302d during the emptying (FIG. 8) of the canister 2 and it therefore being possible for the sealed connection between the canister adapter and the tank adapter to be released.

A further special feature of the device consists in the flushing connector 308 which is attached to the tank adapter 3 and via which both the emptied canister 2 and the two contact faces 409a, 306a in the case of partial removal can be flushed.

In the following text, these two flushing variants will be explained in greater detail using FIGS. 8 and 9.

In the tank adapter 3, a flushing line 309 runs from the flushing connector 308 as far as the longitudinal center axis 310 of the tank adapter 3 and opens below the sliding sleeve 306 into a central connecting channel 311. Furthermore, the closing piston 409 has an inner channel 409c which opens with one end in the first contact face 409a and opens with its other end via the guide sleeve 414a on the canister fastening flange 400. The connecting channel 311 opens on the second contact face 306a, with the result that the inner channel 409c and the connecting channel 311 merge into one another. At its end which faces the canister 2, the guide sleeve 414a has one or more nozzle openings 414b. The cleaning liquid 6 which is fed in via the flushing connector 308 takes the flow course (second fluid connection) which is shown in FIG. 8 via the flushing line 309, the connecting channel 311, the inner channel 409c and the guide sleeve 414a and exits via the nozzle opening 414b in a plurality of part jets into the canister 2, in order to detach residues of the fluid 5 which still remain in the canister. The flushing liquid with the detached residues then takes the path which is already known from FIG. 7 (first fluid connection).

In the flow path of the cleaning liquid 6, a first shut-off element 312 which is configured as a ball valve is arranged in the region of the connecting channel 311 and a second shut-off element 409d which is configured as a ball valve is arranged at that end of the inner channel 409c which faces away from the first contact face 409a. The first shut-off element 312 is opened via an actuating pin 313 which is connected to the sliding sleeve 306 when the sliding sleeve 306 passes from the position which is shown in FIG. 2 into the position according to FIG. 7 or 8. In the closed position of the first shut-off element 312 according to FIG. 6, a discharge of cleaning liquid 6 is avoided reliably even when the cleaning liquid 6 is present under pressure, since the pressure of the cleaning liquid presses the shut-off element 312 into its closed position. Moreover, the shut-off element 312 is pressed into the closed position by way of a spring element 314. In order that the flushing line 309 always remains pressureless in a position of the shut-off element in the closed position according to FIG. 6, a small hole 316 is provided, via which a cleaning liquid 6 which is possibly present can flow away into the tank.

If the sliding sleeve 306 is displaced by way of the closing piston 409 into the position according to FIGS. 7 and 8, the actuating pin 313 presses the first shut-off element 312 onto a seat 317 counter to the pressure of the spring element 314 and in the process closes the connection between the flushing line 309 and the hole 316.

The second shut-off element 409*d* likewise interacts with a spring element 409*e*, the closing direction being precisely opposed to the first shut-off element. In other words, the second shut-off element 409*d* in the position according to FIGS. 7 and 8 is situated in its closed position, in which it is pressed onto its valve seat by way of the spring element 409*e*. It is prevented in this way that the fluid 5 passes out of the canister 2 via the nozzle opening 414*b* into the flow channel which is intended for the cleaning liquid 6 and possibly exits in an uncontrolled manner via the flushing connector 308. The spring element 409*e* is dimensioned in such a way that the second shut-off element 409*d* can be opened by way of the cleaning liquid 6 which is present under pressure. Flushing water is usually used as cleaning liquid. To this end, for example, a pressurized water line with an instantaneous shut-off valve can be connected to the flushing connector 308. When the closing piston 409 is open, the first shut-off element 312 is opened by way of the actuating pin 313, with the result that the cleaning liquid can pass via the second shut-off element 409*d* to the nozzle opening 414*b*. Here, the flushing liquid from the cleaned canister 2 runs out at the same time via the outer channel 413 and the simultaneously open closing piston 409.

The first shut-off element 312 prevents the pressure of the cleaning liquid 6 being transmitted into the canister 2 and possibly causing the latter to burst when the closing piston 409 is closed.

If merely a partial quantity is to be removed from the canister 2, the closing piston 409 is moved into its closed position according to FIG. 6 again after removal of the desired quantity, by the actuating element 302 being rotated counter to the clockwise direction in the direction of the arrow 302*d*. Before the canister 2 together with the canister adapter 4 is withdrawn from the tank adapter 3, flushing of the first contact face 408*a* and the second contact face 306*a* can be carried out as follows according to a further refinement of the invention:

A lever 315 is provided on the tank adapter 3, by means of which lever 315 the sliding sleeve 306 and therefore the second contact face 306*a* including the seal 306*b* are displaced downward counter to the pressure of the spring element 304. Here, the first shut-off element 312 is also displaced onto the seat 317 counter to the pressure of the spring element 314 via the actuating pin 313 which is connected fixedly to the sliding sleeve 306, with the result that cleaning liquid 6 can pass via the connecting channel 311 to the two contact faces, in order to flush them. Here, the second shut-off element 409*d* prevents cleaning liquid from penetrating into the canister 2, since the flushing region is pressureless as a result of the free outflow. However, the contact faces can of course also be cleaned after complete emptying of the canister 2.

Moreover, the tank adapter 3 can be flushed without an attached canister adapter 4 if a special flushing or closure cover 9 is attached which closes the tank adapter 3 to the outside and opens the first shut-off element 312 by way of an integrated actuating pin 900. The flushing or closure cover 9 is locked in an analogous manner to the fastening of the canister adapter by way of pulling of the actuating element 302. The cleaning liquid 6 then takes the flow path which is shown in FIG. 10.

The invention claimed is:

1. A device for contamination-free filling of a tank from a canister comprising
    a tank adapter comprising
        a tank fastening flange for fastening to the tank,
        a first coupling part, and
        a closable connecting channel,
    a canister adapter comprising
        a canister fastening flange for fastening to the canister,
        a second coupling part, and
        a closing piston, which is guided in the canister adapter,
        wherein the tank adapter and the canister adapter are connected releasably to each another via the first and the second coupling parts, and
        wherein the closing piston has a first contact face, which is in operative contact with a second contact face, which is on the tank adapter, when the second coupling part of the canister adapter is coupled to the first coupling part of the tank adapter,
    and
    a flushing connector for feeding a cleaning liquid, wherein the flushing connector is attached to the tank adapter and connected to the closable connecting channel,
        wherein the device provides a fluid connection between the canister fastening flange and the tank fastening flange in an open position and closes the fluid connection between the canister fastening flange and the tank fastening flange in a closed position,
        wherein the second contact face can be raised up from the first contact face, when the second coupling part of the canister adapter is coupled to the first coupling part of the tank adapter;
        wherein the closing piston can be adjusted between the open position and the closed position via a first actuating element, and
        wherein the closing piston has an inner channel, which provides a fluid connection between the flushing connector and the canister fastening flange in the open position,
        wherein the inner channel of the closing piston opens with one end in the first contact face and is connected by way of another end to the canister fastening flange, and the closable connecting channel opens with one end in the second contact face and is connected by way of another end to the flushing connector,
        wherein the connecting channel opens in the second contact face and the inner channel of the closing piston opens in the first contact face such that the connecting channel and the inner channel are fluidly connected to each another, when the tank adapter and the canister adapter are in contact with each another via the two contact faces,
        wherein the canister adapter has an outer channel, which is arranged around the closing piston by way of an annular space and, in the open position, is a part of the fluid connection between the canister fastening flange and the tank fastening flange.

2. The device of claim 1, wherein, in the open position of the device, the first and the second coupling part provides a first fluid connection between the canister fastening flange and the tank fastening flange and a second fluid connection, which can be shut off between the flushing connector and the canister fastening flange.

3. The device of claim 1, wherein at least one sealing element is provided on the first or the second coupling part for a fluid-tight connection between the tank adapter and the canister adapter.

4. The device of claim 1, further comprising a seal disposed between the two contact faces.

5. The device of claim 1, wherein the closing piston is guided in a slotted guide on the canister adapter, and wherein a rotation of the canister adapter with respect to the closing piston brings about a displacement of the closing piston relative to the canister adapter.

6. The device of claim 1, wherein the first coupling part of the tank adapter is secured rotatably on the tank adapter by way of the first actuating element.

7. The device of claim 1, wherein the first contact face of the closing piston is in a fixed contact with the second contact face on the tank adapter so as to rotate therewith, when the second coupling part of the canister adapter is coupled to the first coupling part of the tank adapter, and wherein a rotation of the second coupling part relative to the tank adapter brings about a displacement of the closing piston relative to the canister adapter.

8. The device of claim 1, wherein the first contact face of the closing piston is in contact with the second contact face on the tank adapter, when the second coupling part of the canister adapter is coupled to the first coupling part of the tank adapter and the second contact face is secured on the tank adapter such that said second contact face can be displaced in a movement direction of the closing piston, and wherein the second contact face is pressed against the first contact face by a spring element.

9. The device of claim 1, further comprising a second actuating element for raising up the second contact face from the first contact face, when the second coupling part of the canister adapter is coupled to the first coupling part of the tank adapter.

10. The device of claim 1, wherein the canister adapter further comprises a film cutting element in a region of the canister fastening flange for cutting open a sealing film of the canister.

11. The device of claim 10, wherein the film cutting element is formed by a toothed rim.

12. The device of claim 10, wherein the canister adapter further comprises a sliding sleeve, to which the canister fastening flange fastens, wherein the sliding sleeve is axially displaceable relative to the film cutting element.

13. The device of claim 1, wherein the canister fastening flange is configured to interact with an external thread of an opening of the canister.

14. The device of claim 1, further comprising a flushing or closure cover, which can be coupled to the tank adapter and closes the tank adapter to outside.

15. The device of claim 1, wherein the first actuating element is of approximately a U-shaped configuration.

16. The device of claim 9, wherein the second actuating element is a lever.

17. The device of claim 13, wherein the canister fastening flange is a union nut.

* * * * *